(12) United States Patent
Kollin

(10) Patent No.: US 7,040,367 B2
(45) Date of Patent: May 9, 2006

(54) LUBRICANTS FOR RUN-FLAT TIRE SYSTEMS

(76) Inventor: Edward B. Kollin, 5 Malanga Ct., Scotch Plains, NJ (US) 07076

(*) Notice: Subject to any disclaimer, the term of this patent is extended or adjusted under 35 U.S.C. 154(b) by 0 days.

(21) Appl. No.: 10/759,450

(22) Filed: Jan. 16, 2004

(65) Prior Publication Data

US 2004/0147408 A1    Jul. 29, 2004

Related U.S. Application Data

(60) Provisional application No. 60/440,947, filed on Jan. 17, 2003.

(51) Int. Cl.
*B60C 17/00* (2006.01)
*B60C 17/04* (2006.01)
*B60C 17/10* (2006.01)

(52) U.S. Cl. .................. 152/516; 152/520; 152/521

(58) Field of Classification Search ................ 152/157, 152/158, 516, 520, 521; 508/110, 459, 463, 508/465, 485; 252/8.81
See application file for complete search history.

(56) References Cited

U.S. PATENT DOCUMENTS

| 3,954,638 A | * | 5/1976 | Jones et al. ................ 508/251 |
| 4,607,675 A | * | 8/1986 | Patitsas et al. ............... 152/521 |
| 4,784,795 A | * | 11/1988 | Fahl ............................ 508/201 |
| 6,124,248 A | * | 9/2000 | O'Bryant et al. ............ 508/216 |
| 6,664,219 B1 | * | 12/2003 | Lentsch et al. .............. 510/218 |

FOREIGN PATENT DOCUMENTS

| DE | 3914887 | * | 11/1980 |
| EP | 210356 | * | 2/1987 |
| GB | GB 2088898 | * | 6/1982 |
| NL | 7902120 | * | 9/1980 |

* cited by examiner

Primary Examiner—Jeff H. Aftergut
Assistant Examiner—Justin Fischer
(74) Attorney, Agent, or Firm—The Weintraub Group, P.L.C.

(57) ABSTRACT

A lubricant for a run-flat tire system includes a water soluble, or water-miscible carrier, a thickener, and a surfactant. The thickener hereof retains its rheological properties and is not subject to permanent thinning shear. The base fluid is, preferably, a water-soluble polyhydroxyl or other polyhydric compound and the thickener is preferably a clay. When admixed with a surfactant and, optionally, a lubricity agent, the lubricant exhibits long term stability and (is resistant to heat buildup.) prevents the buildup of heat in the tire assembly when the tire is in the run flat condition.

11 Claims, No Drawings

LUBRICANTS FOR RUN-FLAT TIRE SYSTEMS

CROSS-REFERENCE TO RELATED APPLICATIONS

This application is a completion application of copending U.S. patent application, Ser. No. 60/440,947, filed Jan. 17, 2003, for "Lubricants for Run-Flat Tire Systems", the disclosure of which is hereby incorporated by reference.

BACKGROUND OF THE INVENTION

1. Field of the Invention

The present invention concerns run-flat tire systems. More particularly, the present invention concerns lubricants for run-flat tire systems. Even more particularly, the present invention pertains to thickened, dry and/or encapsulated lubricants for run-flat tire systems.

2. Prior Art

As is known to those skilled in the art to which the present invention pertains run-flat tires have become prevalent in automobiles to enable the vehicle to remain driveable over a sufficient distance to enable tire repair. Although there exists many configurations for such tires, one of the more promising run-flat tire systems comprises a tire, a wheel rim or wheel, and an interior support ring. The support ring, which is disposed interiorly of the tire, carries the vehicle weight if its associated tire loses pressure. In such instance, when the outside tire collapses it contacts the inner support ring. Typically, the inner support ring is disposed about one to three inches from the interior surface of the tire when the tire is fully inflated.

In order for such run-flat tire or tire system to be effective, it is essential that a lubricant be disposed between the exterior surface of the support ring and the inner surface of the tire. This lubricant is intended to prevent a temperature increase or reduce the rate of temperature increase to an acceptable level, i.e. a level low enough to prevent thermal degradation of any of the elastomeric components of the tire for the manufacturer's specified period of time under its specified conditions. This temperature rise is due to the friction between the support ring and the inner surface of the tire due to their relative motion caused by their differing diameters. Usually, the lubricant is intended to be deposited onto the interior surface of the tire.

Manufacturer's specifications, in addition to temperature increase parameters, require that the lubricant have a gel-like or grease-like consistency so that it will remain in place and not leak or flow while the tire remains in its inflated or non-run-flat condition.

Furthermore, in order for the lubricant to be environmentally acceptable in today's market, it is all but necessary that it be water-based. The art has addressed these issues and created thickened lubricants for meeting these criteria. However, these prior art lubricants still need major improvements. First, ordinarily from about 75 to about 300 grams of lubricant need to be applied to the inside of the tire. Under the best of conditions, this major quantity of the current lubricants required in order to provide an efficacious system, is unacceptable because of wheel balance requirements, cost of lubricant, etc.

Moreover, known run-flat tire thickened lubricants undergo a permanent thinning transformation and, thus, pour like the liquid starting material, when exposed to shear stresses or rubbing under pressure. The shear stress or rubbing occurs because the gap between the support ring and the tire is relatively small and the two occasionally make contact when driving over speed bumps, pot holes, curbs, and the like in a non-run-flat condition. This contact, eventually, causes these prior art lubricants to permanently revert back to a liquid state. After being liquefied by this intermittent contact, if the tire punctures, all of the lubricant runs out and the tire fails prematurely.

As will be detailed hereinafter, the present invention provides a thickened lubricant which is particularly adapted for utilization in a run-flat tire system.

SUMMARY OF THE INVENTION

In accordance herewith there is provided, in a first embodiment, a lubricant which generally comprises:

(a) a water-soluble base fluid or carrier which is, preferably, a polyhydroxyl compound or other polyhydric compound or other organic compound;
(b) a thickener, thickening agent or thickening system,
(c) a surfactant, and
(d) optionally, a lubricity agent.

The composition may further include activators for the thickener, water and other adjuvants, as noted below.

For a more complete understanding of the present invention reference is made to the following Detailed Description and accompanying non-limitative examples.

DESCRIPTION OF THE PREFERRED EMBODIMENTS

With more particularity, and as noted above, the first component of the present lubricant is the base fluid or carrier. The base fluid is, preferably, a water-soluble polyhydroxyl compound or other polyhydric compound.

Among the useful water-soluble polyhydroxyl compounds are, for example, diols, triols, tetrols, as well as higher polyhydric alcohols and glycol ethers, as well as mixtures thereof.

Representative of the useful polyhydroxyl compounds, are, for example, low molecular weight polyalkylene glycols, such as polyethylene glycols, polypropylene glycols, polybutylene glycols, polyhexylene glycols, etc., as well as glycerin, sorbitol, and the like as well as mixtures thereof may be used herein. By the term "low molecular weight" as used herein is meant a molecular weight ranging from about 60 to about 2000.

Also, solubilized oil derivatives, esters, and the like may be used herein as the base fluid. Also, oil-soluble or oil-miscible base fluids may, also, be used herein. Suitable oil-soluble fluids include, for example, mineral oils, synthetic oils, silicone oils, plant derived oils, and the like, as well as emulsions of either, oil-in-water, water-in-oil, or other multi-phase systems. These oil-soluble or miscible fluids, as well as the other solubilized oil derivatives may be used herein, alone, or in admixture with the polyhydric compound.

The preferred carrier or base fluid is dictated by the type of support ring deployed in the tire. For example, large American-made run-flat tires normally utilize (polyurethane) synthetic elastomer support rings. This dictates the use of a mixture of glycerin and butylene glycol as the preferred base fluid. Typically the mixture will be deployed in about a 1:1 to about 4:1, respective, weight ratio.

On the other hand, European and Asian run-flat tires employ rubber support rings. This requires a polyalkylene glycol as the base carrier.

The thickener used herein may be organic or inorganic. Examples of suitable thickeners include clay, kieselguhr earths, cellulosic materials, such as hydroxymethyl cellulose, carboxymethyl cellulose, and waxes, such as carnauba wax, fumed silica, pigments, such as carbon black, and the like.

Other useful thickeners include, for example, polyisobutylene (PIB), soaps such as alkali earth metal soaps, aluminum stearate, polymers such as a polyurea, polyethylene terephthalates, polyethylenes, polycarbohydrates, polycarboxylates, etc., and the like. Also, polyacrylate thickeners may be used.

The thickener used herein may also be a pre-gelled cellulose thickener or an associative-type thickener, used alone or in conjunction with any of the other useful thickeners. Both pre-gelled cellulose and associative thickeners are well-known and commercially available. Associative thickeners, generally, comprise hydrophobically-modified hydroxymethyl cellulose, alkali-swellable emulsions and hydrophobically-modified ethoxylated urethanes. In the practice of the present invention, either the modified cellulose or urethane-type associative thickener may be used. In using such a thickener, generally, it is mixed with a liquid such as water or a polyhydroxyl compound such as a glycol, a triol or the like, as well as mixtures thereof. Generally, from about 1 to about 15 parts thickener to about 85 to about 99 parts liquid is used. Where a liquid mixture is used, it is prepared by mixing the two components together in a weight ratio of about 1 to about 10 parts of water to about 90 to about 99 parts of polyhydroxyl compound.

The preferred polyhydroxyl liquid compound is either butylene glycol or glycerin, although other glycols can be used alone or in admixture with the butylene glycol, and/or glycerin including, for example, ethylene glycol, propylene glycol, and the like.

An activator such as triethanolamine is incorporated herewith. This pre-gelled thickener mixture is then used in small amounts ranging from about 0.5% to 10%, by weight, based on the total weight of the lubricant and is admixed with the lubricant formulation at ambient conditions to define a thickened lubricant having the requisite properties and consistency including viscosity and stickiness necessary to hold the lubricant formulation in place for an extended period of time and which is particularly useful over extended periods of time for up to about five years.

Mixtures of both organic and inorganic thickeners may be used herein.

In the practice of the present invention it is preferred that the thickener be inorganic and specifically, a clay. Among the useful clays are bentonite clay, hectorite clay and the like, as well as mixtures thereof. The preferred clay is bentonite clay.

The third component of the formulation, as noted above, is the surfactant. The surfactant aids in the thickening of and stabilizes the admixture of carrier and thickener to hold its viscosity.

Useful surfactants include, for example, nonionic, cationic, anionic and amphoteric surfactants. Useful nonionic surfactants include, for example, polyoxyethylene derivatives of suitable polyhydric compounds including alcohols, diols, triols, etc.; ethylene oxide-propylene oxide adducts of ethylene glycol; oxyalkylated alkyl phenols, such as the ethylene oxide adducts of octylphenols and nonylphenols, alkanolamides, ethylene oxide or ethylene oxide/propylene oxide adducts of silicone, amine oxides, alkyl esters, alkylamines, and the like, as well as mixtures thereof.

Examples of useful anionic surfactants include branched and linear alkylbenzene sulfonates, alkyl sulfates, and the like, as well as mixtures thereof.

Representative examples of cationic surfactants include quaternary and amido amine salts.

Useful amphoteric surfactants include the betaines such as alkyl betaines, imidazoline betaines and the like and sultaines such as alkyl hydroxysultaine.

Mixtures of surfactants such as nonionic and anionic, nonionic and cationic, and nonionic and amphoteric surfactants as well as mixtures of cationic and amphoteric and anionic and amphoteric may be used.

Preferably, the surfactant is a silicone surfactant and, preferably, a polyoxyalylene oxide modified silicone sold by GE silicones under the name Silwet 8610

Carboxylated acrylic copolymer surfactants may also be used herein.

In formulating the present lubricant, the carrier is present in an amount ranging from about 10% to about 95%, by weight, based upon the total weight of the lubricant formulation.

The thickener is present in amount ranging from about 0.5% to about 40%, by weight, based upon the total weight of the formulation.

The surfactant is present in an amount ranging from about 0.1% to 25%, by weight, based upon the total weight of the formulation.

As noted hereinabove, adjuvants, such as, clay activators, corrosion inhibitors, chelating agents, antibacterial agents, antifungal agents, lubricity enhancers, antioxidants, humectants and the like, as well as mixtures thereof may be incorporated into the lubricant formulation. Where used, minor amounts of the adjuvant are used, they will be present. Generally, the adjuvants are added in amounts ranging from about 0.05% to 30% by weight, based on the total weight of the formulation.

Representative of the lubricity enhancers include, for example, many of the above-noted surfactants, as well as boron derivatives, i.e. boron amides and boric acid, or esters, and silicones etc.

The other adjuvants are well known and commercially available including, for example, glycerin and sorbitol. Many of the polyhydric compounds, such as glycerin and sorbitol are well known humectants. Other humectants include panthenol, quatemium 22 and the like.

Typical anti-bacterial compounds include triclocarbon, bacitracin, chloroxylenol, and so forth. Typical anti-fungal agent, such as o-phenyl phenol, thiabendazol, Imazaril, can be used. Also, the well known and commercially available corrosion inhibitors, chelants, antioxidants and the like may be incorporated hereinto.

The lubricant obtained hereby is a thickened grease or gel-like lubricant which can be directly deposited onto the interior surface of the tire where it can remain for extended periods of time. When the inner surface of the outer tire and the lubricant contacts the support ring, due to a bump on the road or the like, the lubricant undergoes substantially temporary shear thinning, and then returns to substantially its starting viscosity. Generally, the thickened lubricant hereof will have a viscosity above 100,000 cps at 25° C. and 1–20 RPM as measured with a Brookfield viscometer.

Stated otherwise, the lubricant hereof can be classified by NLGI consistency numbers as falling between ASTM Worked Penetration of 85 corresponding to NLGI #6 to a Worked Penetration of 475 corresponding to NLGI #000.

Generally, from about 50 to about 150 grams of lubricant is deposited onto the tire interior.

It should be noted that after the lubricant is prepared, its viscosity may be adjusted downward by the addition of minor amounts of the base fluid.

Alternatively, the lubricant hereof can be encapsulated in a gelatin or other water-soluble capsule, such as disclosed in U.S. Pat. Nos. 3,927,196; 5,250,344 and 6,358,296, the disclosures of which are hereby incorporated by reference.

After preparation, the encapsulated lubricant is applied to the support ring where it remains in place.

Because of the rubbing between the interior of the tire and the support ring where there is contact therebetween, shear thinning occurs to lower the viscosity of the thickened lubricant and thus minimize the build up of heat in the tire assembly thereby allowing the possibility of repair of the tire system. Furthermore, at shear rates of 10 to 100,000 reciprocal seconds, the present lubricant does not undergo permanent shear thinning but temporary shear thinning followed by rapid rebuild and viscometric recovery when the shear stresses are removed.

For more complete understanding of the present invention, reference is made to the following illustrative, non-limiting examples. In the examples, all parts are by weight, absent indications to the contrary.

EXAMPLE I

This example illustrates the preparation of a thickened lubricant in accordance herewith.

A thickened lubricant suitable for compatible rubber support rings is prepared in a suitable vessel from the following ingredients:

| Ingredient | Amount, pbw |
| --- | --- |
| Polyalkylene glycol[1] | 80.5 |
| Bentonite clay[2] | 13.0 |
| Nonionic surfactant[3] | 4.0 |
| Propylene carbonate, as an activator | 2.0 |
| Water | 0.5 |
| | 100.0 |

[1]a 1590 mol. Wt. Polyakylene Glycol "Ucon Fluid" sold by Dow Chemical.
[2]Baragel 10 a bentonite clay sold by Elementis Specialties.
[3]an ethylene oxide-propylene oxide adduct of a silicone sold by GE Silicones under the name Silwet 8610

In preparing the lubricant, the glycol, clay, activator and water are mixed together at ambient conditions in a high-speed blender. Thereafter, this mixture is passed through a colloid mill to shear the clay and form the grease. Next, the surfactant is added. Then, a minor amount of additional glycol can be added to adjust the viscosity.

A suitable quantity of the gel-like lubricant is then applied to the interior of the tire carcass.

EXAMPLE II

Following the procedure of Example I, a thickened lubricant is prepared from the following ingredients:

| Ingredient | Amount, pbw |
| --- | --- |
| Polyalkylene glycol[1] | 78.0 |
| Bentonite clay[2] | 16.0 |
| Alcohol ethoxylate surfactant | 3.0 |
| Propylene carbonate, as a clay activator | 2.3 |
| Water | 0.7 |
| | 100.0 |

[1]a 1590 mol. Wt. Polyakylene Glycol "Ucon Fluid" sold by Dow Chemical.
[2]Baragel 10 a bentonite clay sold by Elementis Specialties.
[3]BIO-SOFT N1-3 sold by Stepan Chemical

EXAMPLE III

This example illustrates the preparation of a thickened lubricant which is suitable for use with a wide variety of elastomeric support rings.

The lubricant is prepared by mixing together, at room temperature, in a high-speed blender, the following ingredients:

| Ingredient | Amount, pbw |
| --- | --- |
| Base fluid[1] | 60.0 |
| Bentonite clay | 24.0 |
| Propylene carbonate, as an activator | 3.0 |
| Water | 0.5 |
| | 87.5 parts |

[1]1:2 weight mixture of 1, 4-butylene glycol and glycerin.

After milling the so-obtained mixture, 3.0 parts of the silicone surfactant used in Example I is added thereto to additionally thicken and stabilize the material. Next, 7.5 parts of glycerin is added thereto. Next, 2.0 parts of a mixture of a pre-gelled alkali swellable emulsion sold by Elementis under the name Benaqua 4000 is added thereto. Prior thereto, 10 parts of the associative/clay thickener is first added to 88 parts glycerin and thoroughly mixed therewith. Then 2 parts triethanolamine is added and thoroughly mixed. This associative thickener mixture is then mixed to form a gel.

This thickened formulation is then applied to a support ring of a run-flat tire.

EXAMPLE IV

Following the procedure Example III, a lubricant in accordance herewith is prepared from the following ingredients:

| Ingredient | Amount, pbw |
| --- | --- |
| Glycerin | 64.5 |
| Bentonite clay | 24.0 |
| Propylene carbonate, as an activator | 3.0 |
| Water | 0.5 |
| Associative thickener mixture | 3.0 |
| Silicone surfactant | 4.0 |
| | 100.0 |

The above ingredients are mixed together, milled and thereafter, the surfactant and associative thickener mixture is added thereto. The associative thickener mixture is prepared by mixing together 50 parts glycerin, 25 parts butylene glycol, 20 parts water, and 5 parts of a urethane associative thickener, sold by Elementis under the name Rheolate 216. This admixture is stirred at moderate speed for 30 minutes.

To any extent necessary, additional amounts of glycerin are added thereto to lower the viscosity to the desired range.

EXAMPLE V

A lubricant in accordance with the present invention is prepared from the following ingredients:

| Ingredient | Amount, pbw |
| --- | --- |
| Polyethylene glycol[1] | 88.1 |
| Bentonite clay | 7.0 |
| Propylene carbonate, as an activator | 2.0 |
| Water | 0.9 |
| Alcohol ethoxylate[2] | 2.0 |
| | 100.0 |

[1]PEG 200 sold by Union Carbide Corporation
[2]BIO-Soft N1-3 sold by Stepan Chemical The procedure used is as described hereinabove wherein all of the ingredients except the surfactant are mixed together and blended and then sheared in a colloid mill and thereafter, the surfactant is added thereto.

After the clay as been sheared and the surfactant added, additional amounts of the glycol are added thereto to adjust the viscosity.

Subsequent thereto, 0.2 parts of a water-soluble triazole corrosion inhibitor and 0.2 parts of a phenolic antioxidant are added thereto, which together provide a 100 parts lubricant composition.

EXAMPLE VI

Following the procedure Example V, a lubricant was prepared from the following:

| | |
| --- | --- |
| Polyalkylene glycol[1] | 49.5 |
| Glycerine | 24.0 |
| Bentonite clay | 21.0 |
| Propylene carbonate | 1.0 |
| Water | 0.5 |
| Silicone surfactant[2] | 4.0 |
| | 100.0 |

[1]a 1590 molecular wt. polyalkylene glycol sold by Dow Chemical
[2]an ethylene oxide propylene oxide adduct of silicone sold under the name Silwet 8610 by C K Witco

EXAMPLE VII

This example illustrates the preparation of a pre-gelled or pre-thickened formulation for use herein.

In a suitable vessel equipped with a high-speed blender is added:

735.0 parts of propylene glycol, 150.0 parts bentonite clay, 10.0 parts propylene carbonate, and 5.0 parts of water.

The mixture is stirred until a substantially uniform mixture is obtained.

In a separate container is added 76 parts butylene glycol and 4 parts hydroxy ethyl cellulose with high speed mixing. With stirring, 20 parts of water is added. The container is placed upon a suitable heating vessel and the mixture is heated to 140° F. with mixing. After a uniform mixture is obtained, the mixture is allowed to cool. Thereafter, 100 parts of this second mixture is added to the first mixture with high speed mixing. The resulting mixture is then sheared in a colloid mill to shear the clay.

The lubricant hereof has the consistency and firmness of grease. The lubricant hereof meets at least the ASTM worked penetration range of 85 NLGI #6 to 475 NLGI #000.

EXAMPLE VIII

This example illustrates the efficacy of the present greases.

Using a conventional greaseworker sold commercially under the name Kohler K 18190, the grease of Example III was tested for both long-term stability and resistance to permanent shear thinning. The sample was tested both "unworked" at both 60 strokes and "worked" at 10,000 strokes in a Kohler Penetrometer model 19500.

The following data shows the results thereof:

| | Unworked | Worked (60 strokes) | Worked (10,000 strokes) |
| --- | --- | --- | --- |
| Penetration | 324 | 300 | 346 |

As can be seen from the data, the test sample substantially retains its unsheared rheological/viscometric properties after exposure to the turbulent mixing in a grease worker.

It should further be noted that a wax, when used herein, may serve either as a thickener, a melting agent or both for the lubricant. Because of heat build-up within the tire during a run-flat or other lubricant "shear" condition, it is advantageous to provide a mechanism for minimizing heat build-up and dissipating the heat as fast as possible. By enabling the lubricant to liquefy, under shear, heat build-up within the tire components is minimized. Any of the waxes identified hereinabove or which have a melting point of from about 85° C. to about 140° C. provide this property to the lubricant and may be used herein.

In addition, it is contemplated that the lubricant hereof can have other adjuvants added thereto, as noted above, including the waxes identified above, polymers and the like which reduce the viscosity in the shear zone.

It is apparent from the preceding that there has been described herein a lubricant which is efficacious for use in a run-flat tire system as well as in other environments.

Furthermore, it is contemplated that a dry formulation having incorporated therein polytetrafluoroethylene (Teflon), graphite, molybdenum disulfide, boron nitride and the like may admixed therewith in the form of polymers or solids to provide the dry lubricant system.

What is claimed is:
1. A run-flat tire, comprising:
(a) an outer tire,
(b) an inner support ring, disposed interiorly of the carcass and having a surface facing the interior surface of the tire, and
(c) a lubricant disposed between the facing surface and the interior of the tire, the lubricant comprising:
(1) a carrier fluid selected from the group consisting of water-soluble fluid, a water-miscible fluid and mixtures thereof;
(2) a thickener;
(3) a surfactant, and wherein the lubricant has an initial viscosity above 100,000 centipoises at 25° C. and from 1 to 20 RPM as measured with a Brookfield viscometer, the lubricant undergoing temporary shear thinning and returning to substantially its starting viscosity after contact between an inner surface of an outer tire and a support ring of the run-flat tire.

2. The run-flat tire of claim 1 wherein the carrier fluid comprises a polyhydroxyl compound selected from the group consisting of diols, triols, tetrols, polyhydric alcohols, glycol ethers and mixtures thereof.

3. The run-flat tire of claim 2 wherein the carrier fluid is selected from the group consisting of polyethylene glycols, polypropylene glycols, polybutylene glycols, polyhexylene glycols, glycerin, sorbitol and mixtures thereof.

4. The run-flat tire of claim 2 wherein the carrier is present in amount ranging from about 10% to about 95%, by weight, based on the total weight of the lubricant.

5. The run-flat tire of claim 2 wherein the thickener is selected from the group consisting of a clay, kieselguhr earths, a cellulosic material, a pre-gelled cellulose, an associative-type thickener, a wax, fumed silica, pigments, polyisobutylene, an alkali earth metal soap, aluminum stearate, polyurea, polyethyleneterephthalate, polyethylenes, polycarbohydrates, polycarboxylates, polyacrylates, and mixtures thereof.

6. The run-flat tire of claim 5 wherein the thickener is a clay.

7. The run-flat tire of claim 6 wherein the clay is selected from the group consisting of bentonite clay, hectorite clay and mixtures thereof.

8. The run-flat tire of claim 5 wherein the thickener is present in an amount ranging from 0.5% to about 40%, by weight, based on the total weight of the lubricant.

9. The run-flat tire of claim 2 wherein the surfactant is a silicone surfactant.

10. The run-flat tire of claim 9 wherein the surfactant is an alkoxylated silicone.

11. The run-flat tire of claim 1 wherein:

(a) the carrier fluid is present in an amount ranging from about 10% to about 95%, by weight, based upon the total weight of the lubricant and is selected by the group consisting of polyethylene glycols, polypropylene glycols, polybutylene glycols, polyhexylene glycols, glycerin, sorbitol and mixtures thereof, (b) the thickener is a clay selected from the group consisting of bentonite clay, hectorite clay, and mixtures thereof, the clay being present in an amount ranging from about 0.5% to about 40%, by weight, based upon the total weight of the lubricant, and (c) the surfactant is an alkoxylated silicone surfactant.

* * * * *